May 1, 1928.  1,668,522
J. ZUBATY
LIGHTING MEANS FOR INSTRUMENT PANELS
Filed March 22, 1926   2 Sheets-Sheet 1
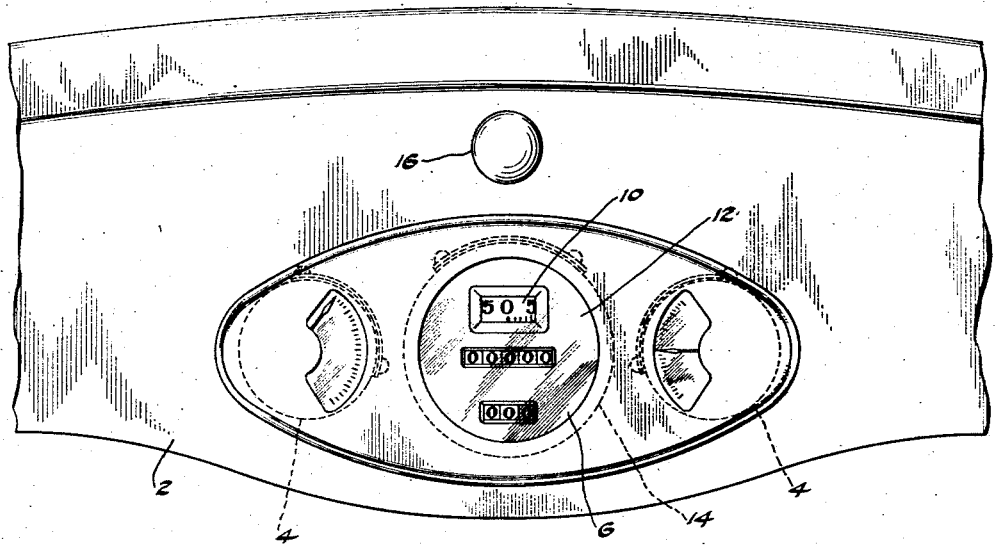
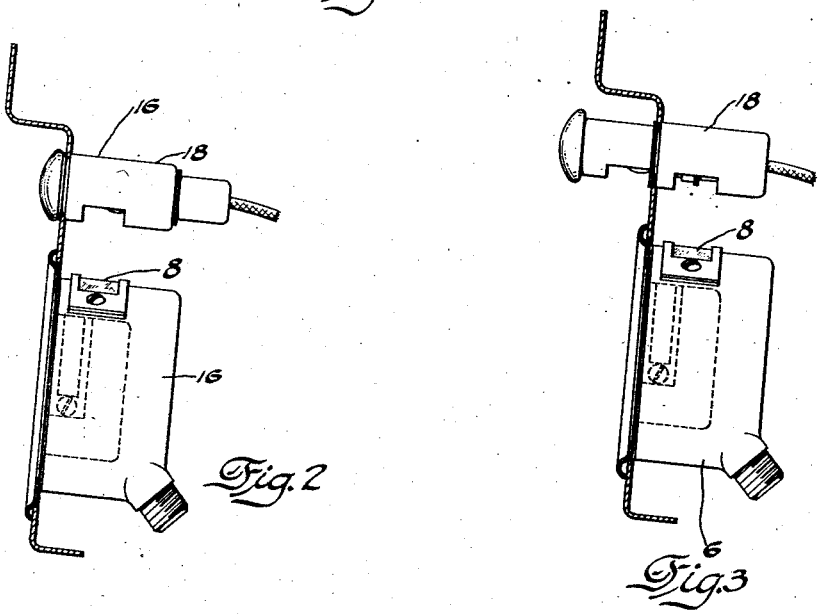
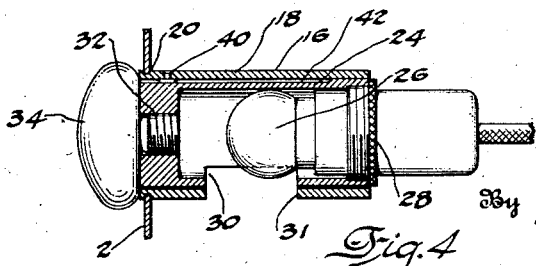
Inventor
Joseph Zubaty May 1, 1928.  
J. ZUBATY  
1,668,522  
LIGHTING MEANS FOR INSTRUMENT PANELS  
Filed March 22, 1926     2 Sheets-Sheet 2

Inventor  
Joseph Zubaty  
By Blackmore, Spencer & Fluil  
Attorney

Patented May 1, 1928.

1,668,522

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

LIGHTING MEANS FOR INSTRUMENT PANELS.

Application filed March 22, 1926. Serial No. 96,664.

Instrument boards for automobiles are now commonly lighted by a shielded light source usually mounted on the board and projecting its rays directly upon the faces of the instruments. Most of the rays strike surfaces which are poor reflectors or good diffusers so that the reflected beams are of low intensity and cause the driver no discomfort. However, some of the rays strike highly efficient reflecting surfaces, such as the nickel plated parts of the instrument mountings and control fittings, and the glass covers of the instruments and are thrown into the driver's eyes either directly or indirectly as by rereflection in the windshield glass. These rays are of sufficient intensity to produce the effect of glare thereby impairing the vision of the driver and producing eye strain. Under such circumstances driving is customarily done with the instrument board unlighted thus reducing the strain but affording the driver no opportunity to inspect the speedometer, oil gage, ammeter, and other instruments requiring occasional observation.

In an effort to overcome the difficulties inherent in such a system various methods of indirectly lighting the instruments have been resorted to. These methods usually involve the projection of light upon the instrument dial to the rear of the usual cover so that the only reflecting surface which is effectively lighted is the dial itself and this surface is of such character as to diffuse the light so that the rays reaching the driver's eye are of such low intensity as to be unobjectionable. These systems of lighting possess the fault that usually no provision is made for the lighting of the driver's compartment and particularly for the illumination of the transmission lock, and the various controls mounted upon or adjacent the instrument panel. To overcome this defect it has frequently been found necessary to install an additional light upon the dash.

The object of the present invention is to provide a lighting means which by a simple manipulation may serve to illuminate either the instruments alone or the instruments as well as the adjacent portions of the instrument panel and driver's compartment. This means consists preferably of a single light source arranged so that its light may be directed either indirectly upon the instruments or directly upon the face of the panel.

In its simplest form the invention consists of a light source which is adapted to be shifted to either of two positions to effect the described variation in light distribution. With this arrangement it is apparent that I secure the advantages of the two systems of lighting above described without appreciable complication over the lighting arrangements now customarily provided.

In the drawings:

Figure 1 is a fragmentary view of a portion of an instrument panel showing my improved lighting means applied thereto.

Figure 2 is a central vertical section through the panel of Figure 1, the lighting device and one of the instruments being shown in elevation. In this view the lighting means is arranged for the indirect lighting of the instruments.

Figure 3 is a view coresponding to Figure 2 but with the lighting means arranged for the direct illumination of the instrument board as well as the driver's compartment.

Figure 4 is a sectional view through the lighting device.

Figures 5, 6, 7:
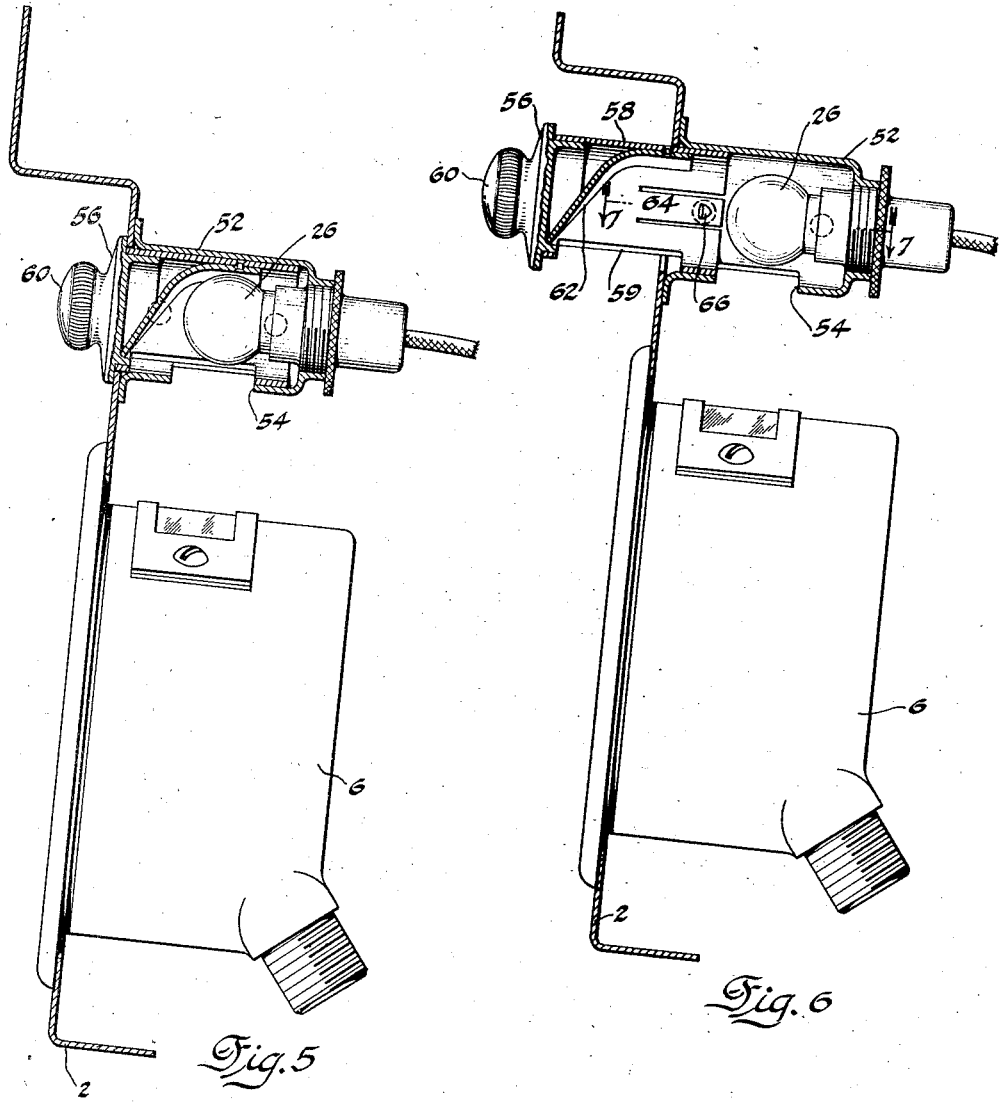
Figures 5 and 6 show a modification in two different positions of adjustment.
Figure 7 is a section on line 7—7 of Figure 6.

The reference character 2 indicates an instrument panel of any desired construction upon which are mounted the usual instruments such as the gauges 4, and the speedometer 6. The casings for these instruments are provided with openings 8 of transparent material, such as pyralin, through which the light may enter for the illumination of the usual dials located to the rear of the glass cover 12 and face plate 14 indicated in Figure 1. In this respect the construction is substantially the same as that shown and described in my prior application Ser. No. 47,058, filed July 30, 1925. As in that case portions of the interior of the instrument casings, and particularly the rear face of the face plate 14, are painted white so that the reflected light which finally reaches the dials is of sufficient intensity. While I have indicated one specific construction of instrument board assembly in which provision is made for applying light to the instruments alone, it is obvious that various other arrangements may be used for the same purpose. My lighting device is numbered 16. It consists of a guide 18 in the form of a cylinder shown as clamped or swaged in opening 20 in the instrument panel 2. Within this guide is mounted a casing 24 and within the casing 24 is mounted a light source 26 consisting of the usual incandescent lamp bulb. The bulb is shown as held in position by means of a threaded collar 28 engaging internal threads formed on the casing 24 but any other suitable means may be used for securing the lamp in position. The casing 24 is provided with an opening 30 which, in the adjustment of parts shown in Figures 2 and 4, registers with opening 31 in guide 18. Through these alined openings light from the lamp 26 is projected and the interior of the casing is preferably provided with a good reflecting surface. The outer end of the casing is preferably provided with a threaded aperture 32 for receiving the stem of a closure 34 which serves as a manipulating means for shifting the casing and lamp when desired. The part 34 may, if desired, be formed of translucent material.

The guide 18 is provided with a stop 40 engaging in a slot 42 in the casing 24 and serving to limit outward movement of the casing. Closure 34 limits its inward movement.

Figures 2 and 3 clearly show the operation of the device. With the casing 24 and its contained bulb in the position shown in Figure 2, the greater proportion of the light from the bulb is directed through the apertures 8 in the instrument casings where a portion of it eventually reaches the dials and serves for their illumination. There is, however, some slight general illumination of the adjacent parts of the car.

Figure 3 shows the casing drawn to its outermost position where the light from the blub is directed upon the instrument board as well as the driver's compartment. With the lighting device in this position the other parts such as the transmission lock, carburetor controls, and switches are effectively illuminated. When the part 34 is made of translucent material it serves to mark the position of the lighting means so that the latter can be readily located for manipulation when the casing is in its innermost position.

In the modification shown in Figures 5 to 7, the light source 26 is stationary and a movable reflector is provided. Thus the light source is mounted in a cylindrical member 52 fixed to the instrument panel and provided with slot 54 through which light is projected upon the instruments as in the first form. Within the member 52 is slidably mounted a reflecting device 56. This device comprises a cylindrical member 58 guided for sliding movement in member 52 and having slot 59 for registration with slot 54. The outer end of the member 58 is closed by a knob 60. Within member 58 is secured reflector 62. Figures 6 and 7 show the member 58 provided with a detent in the form of a tongue 64 having a pressed out portion 66 adapted to engage either of two recesses 67 formed in member 52 to hold the reflecting device in either of its adjusted positions.

It is apparent that when the reflecting device is in the position shown in Figure 5, light from source 26 is directed upon the instruments at the rear of the panel. In the position shown in Figure 6 while a portion of the light is projected upon the instruments at the rear of the panel, a portion is also directed by reflector 62 upon the face of the instrument panel and upon surrounding objects. It is apparent that by varying the size of the reflector and of the opening in the casing 52, and by varying the position of the light source, the light may be divided between the face of the panel and the instrument dials as desired.

I claim:

1. The combination with a supporting panel, of a source of light mounted adjacent said panel, a reflector movably mounted adjacent said panel, said reflector being adjustable to project the light from said source upon either side of said panel as desired.

2. The combination with an instrument panel, of an instrument mounted thereon, said instrument having a dial and a casing provided with an aperture for the inspection of the dial and with a second aperture for the projection of light onto the dial at the rear of said inspection aperture, a source of light mounted adjacent said panel, and means for directing light from said source either upon said dial or through said first named aperture.

3. The combination of a panel, a guide secured to the panel, and a reflector having a light emitting opening slidably engaged in said guide and adapted to be adjusted to position said light emitting opening on either side of said panel as desired said guide being provided with an opening for registration with the opening in the reflector in the nested position of the latter.

4. In the combination as defined in claim 3, a light source mounted in said reflector for movement therewith.

5. In the combination of an instrument panel, a casing slidably mounted in said panel, a light mounted in said casing, said casing being arranged in one position for the projection of light at the rear of the panel and in another position for the projection of light in front of the panel, the outer end of said casing being formed of translucent material.

6. The combination of a supporting panel, a light directing means adjustably mounted in said panel so as to project light on either side thereof as desired, said light directing means being provided with a translucent portion arranged to be visible from one side of said panel in either position of adjustment.

7. The combination with an instrument panel, of an instrument thereon having a dial, a cover for the instrument permitting inspection of the dial, said instrument being apertured to permit the projection of light upon its dial at the rear of said cover, and a light directing means adjustably mounted adjacent the dial and adapted to project light upon said dial either to the rear of said cover or through said cover.

8. The combination of an instrument panel, a plurality of instruments mounted on the panel and provided with passages opening at the rear of the panel for the projection of light upon the dials of the instruments, a light source mounted at the rear of said panel, and a reflector slidably mounted in the panel and arranged to be adjusted outwardly to direct a portion of the light from said source upon the face of the panel.

9. The combination with an instrument panel of an instrument mounted thereon, said instrument having a dial and a casing provided with an aperture for the inspection of the dial and with a second aperture for the projection of light upon the dial from the rear of the panel, and lighting means adjustably mounted adjacent said dial and adapted to be adjusted to project light thru one or the other of said apertures for illuminating the dial.

10. The combination with an instrument panel of an instrument mounted thereon, said instrument having a dial and a casing provided with an aperture for the inspection of the dial and with a second aperture for the projection of light upon the dial from the rear of the panel and a light source slidably mounted in the panel and adapted to be extended outwardly of the panel to project its light upon the panel and surrounding objects or to be positioned rearwardly of the panel to project light thru said second-named aperture.

11. The combination with an instrument panel of an instrument mounted thereon, said instrument having a dial and a casing provided with an aperture for the inspection of the dial and with a second aperture for the projection of light upon the dial from the rear of the panel, a source of light, and means for projecting light from said source thru one or both of said apertures.

12. The combination of a panel, an instrument mounted on the panel, a source of light at the rear of the panel, said panel being provided with an opening and a closure for the opening, said closure when in open position permitting the passage of light forwardly of the panel.

13. In the combination as defined in claim 12, said closure having the side toward the light source provided with a reflecting surface.

14. In the combination as defined in claim 12, said instrument being provided with a casing having an aperture at the rear of the panel for the passage of the light to the instrument dial.

15. In an automobile, the combination of an instrument panel having an instrument mounted thereon, and a source of light movably mounted on the panel so as to occupy either a position projecting its light on the face of the instrument, or a position projecting its light at the rear of the panel and within the driver's compartment.

16. In an automobile, the combination of an instrument panel having an instrument mounted thereon, said panel being provided with an aperture therein and a source of light slidably mounted in the aperture and adapted for adjustment to an outer position in which light is projected on the face of the instrument or to an inner position in which light is projected at the rear of the panel.

17. In an automobile, the combination of an instrument panel having an aperture therein, an instrument mounted on the panel, a source of light, a carrier for said light source mounted in said aperture and adapted for adjustment to position the light source so as to project its light either on the face of the instrument or at the rear of the panel, as desired, said carrier being provided with means for closing said aperture when in either of said positions.

In testimony whereof I affix my signature.

JOSEPH ZUBATY.